(12) United States Patent
Pachauri et al.

(10) Patent No.: US 11,790,412 B2
(45) Date of Patent: Oct. 17, 2023

(54) CUSTOMER RELATIONSHIP MANAGEMENT CALL INTENT GENERATION

(71) Applicant: HIGHRADIUS CORPORATION, Houston, TX (US)

(72) Inventors: Abhinav Pachauri, Miyapur (IN); Sonali Nanda, Miyapur (IN); Pratyush Sunandan, Hyderabad (IN); Murali Dodda, Puppalguda (IN)

(73) Assignee: HighRadius Corporation, Houston, TX (US)

( * ) Notice: Subject to any disclaimer, the term of this patent is extended or adjusted under 35 U.S.C. 154(b) by 691 days.

(21) Appl. No.: 16/412,213

(22) Filed: May 14, 2019

(65) Prior Publication Data

US 2020/0265445 A1 Aug. 20, 2020

(51) Int. Cl.
*G06Q 30/02* (2023.01)
*H04M 3/51* (2006.01)
(Continued)

(52) U.S. Cl.
CPC ......... *G06Q 30/0281* (2013.01); *G06F 9/451* (2018.02); *G06N 20/00* (2019.01); *G06Q 10/06316* (2013.01); *G06Q 10/06393* (2013.01); *G06Q 10/06398* (2013.01); *G06Q 20/40* (2013.01); *G06Q 30/016* (2013.01);
(Continued)

(58) Field of Classification Search
CPC ............. G06Q 30/0281; G06Q 30/016; G06Q 10/06316; G06Q 10/06393; G06Q 10/06398; G06Q 20/40; G06F 9/451; G06N 20/00; G10L 15/26; H04L 63/08; H04M 3/5166; H04M 3/5175
See application file for complete search history.

(56) References Cited

U.S. PATENT DOCUMENTS 9,961,519 B1 * 5/2018 Ashe .................... G06F 16/2379
10,038,788 B1 * 7/2018 Khalatian ............... H04L 65/60
(Continued)

OTHER PUBLICATIONS

Roberts-Lombard, Mornay. "Customer retention through customer relationship management: The exploration of two-way communication and conflict handling." African journal of business management 5.9 (2011): 3487.*

*Primary Examiner* — Peter Ludwig
*Assistant Examiner* — Donald J Edmonds
(74) *Attorney, Agent, or Firm* — Quarles & Brady LLP

(57) ABSTRACT

An enhanced customer relationship management (CRM) system is provided. The enhanced CRM system performs activities automatically and with the assistance of artificial intelligence and machine learning based on historical information. The enhanced CRM system provides: a) scheduling assistance prior to a customer contact, b) assistance during a call to direct call focus and achieve a personal connection between a customer facing user of the CRM system and a target customer contact, and c) automated assistance to complete a contact and transition to a next target customer contact. Achievement goals for a customer facing user may be presented and monitored with respect to a goal achievement period. Schedules may be dynamically adjusted across multiple CRM system users and with respect to overall organizational goals to enhance achievement of goals.

17 Claims, 10 Drawing Sheets

(51) Int. Cl.

| | |
|---|---|
| *G06Q 30/016* | (2023.01) |
| *G06N 20/00* | (2019.01) |
| *G06Q 10/0631* | (2023.01) |
| *G06Q 10/0639* | (2023.01) |
| *G06Q 20/40* | (2012.01) |
| *G06F 9/451* | (2018.01) |
| *H04L 9/40* | (2022.01) |
| *G10L 15/26* | (2006.01) |

(52) U.S. Cl.
CPC .............. *G10L 15/26* (2013.01); *H04L 63/08* (2013.01); *H04M 3/5166* (2013.01); *H04M 3/5175* (2013.01)

(56) References Cited

U.S. PATENT DOCUMENTS

| | | | | |
|---|---|---|---|---|
| 2015/0178371 | A1* | 6/2015 | Seth | G06F 16/2428 707/755 |
| 2015/0195406 | A1* | 7/2015 | Dwyer | G10L 15/26 379/265.07 |
| 2015/0201077 | A1* | 7/2015 | Konig | G06Q 30/0281 379/265.07 |
| 2015/0294404 | A1* | 10/2015 | Wolk | G06Q 40/00 705/7.15 |
| 2015/0356568 | A1* | 12/2015 | Milstein | H04M 3/51 705/304 |
| 2016/0085926 | A1* | 3/2016 | Ivanoff | G06Q 30/0201 705/2 |
| 2016/0239848 | A1* | 8/2016 | Chang | G06Q 30/016 |
| 2017/0187880 | A1* | 6/2017 | Raanani | H04M 3/5232 |
| 2018/0063329 | A1* | 3/2018 | Mitchell | H04L 12/1872 |
| 2018/0139328 | A1* | 5/2018 | Alford | H04M 3/5233 |
| 2018/0165691 | A1* | 6/2018 | Heater | G06F 40/205 |
| 2018/0174085 | A1* | 6/2018 | McCoy | G06Q 30/016 |
| 2018/0260693 | A1* | 9/2018 | Dahlmeier | G06N 20/00 |
| 2018/0376002 | A1* | 12/2018 | Abraham | H04M 3/5183 |
| 2019/0034767 | A1* | 1/2019 | Sainani | G06V 10/95 |
| 2019/0050239 | A1* | 2/2019 | Caldwell | G06Q 30/016 |
| 2019/0347668 | A1* | 11/2019 | Williams | H04L 67/2833 |
| 2020/0151650 | A1* | 5/2020 | Rhodes | G06Q 10/063114 |
| 2021/0192412 | A1* | 6/2021 | Krishnaswamy | G06Q 10/101 |

* cited by examiner

CUSTOMER RELATIONSHIP MANAGEMENT CALL INTENT GENERATION

CROSS-REFERENCE TO RELATED APPLICATIONS

This application claims the benefit of Indian Appl. No. 201941006160, filed Feb. 15, 2019. This application is incorporated herein by reference in its entirety to the extent consistent with the present application.

BACKGROUND

There are many businesses that operate by performing services for external customers and performing services for internal customers. To facilitate these services, corporate enterprises may have one or more automated systems to perform the functions of customer relationship management (CRM) or, more generally, control interaction with either an internal customer or external customer. Some systems, such as debt collection services may be used to interact with an external customer from which a payment is expected. Care should be taken when interacting with customers owing money to make the interaction as professional and productive as possible (e.g., given the emotional characteristics of debt collection).

In a help desk scenario, an internal customer or an external customer may be the "customer" from the perspective of a CRM system. For example, an internal customer may be an employee of the same organization providing the help desk service. In contrast, but supported by a similar CRM system, an external customer may be a person who has placed an on-line order, person dealing with return merchandise authorization (RMA), person dealing with a warranty or claim (insurance claim), etc.

In general, interactions with an entity providing a service and a customer receiving a service may be considered interactions that may be managed by a CRM system. The CRM system may be tailored to include functionality for a specific implementation (e.g., a specific use case). Specifically, a CRM system for a debt collections analyst may have different capabilities than an internally maintained information technology (IT) help desk system. However, each of these CRM systems may also have significant overlapping functionality that may benefit from disclosed techniques of assisting, for example, the debt collections analyst or help desk personnel.

Further, consumers that use credit cards, for example, are typically serviced by an entity known as an "issuer" that will pay for goods on behalf of the consumer. The issuer makes the payment with an expectation that the consumer will later pay the issuer the amount with some additional fees added for providing the convenience of the credit card payment. Another example may be observed in enterprises that offer monthly subscription services. These monthly subscriptions may cover household utilities, communication services, internet services, video streaming services, or any other type of recurring services that result in a monthly recurring charge that the consumer is expected to pay. While this concept is very common, there is no guarantee that the consumer will issue a payment for the services rendered in a timeframe expected by the provider.

A consumer that requested the services from a provider may have done so with the knowledge that there was an expectation to pay for the services rendered. However, there may be a variety of reasons a consumer does not pay for the services rendered. The consumer, for example, may not have received any invoice detailing an amount the consumer was expected to pay. In another example, perhaps the consumer miscalculated their budget and simply does not have enough money to pay the expected amount by the expected deadline. Regardless of the reason a consumer has not properly paid for services rendered, it is highly unlikely the consumer will proactively contact the provider to inform them when to expect remuneration for services rendered. Providers, therefore, commonly have one or more Collection Analysts that perform the job of contacting the consumers that have not paid for services rendered. In the context of this disclosure, this type of consumer contact may be considered a "customer contact" and may have similar attributes to other types of contact that may be managed by an enhanced CRM system such as the disclosed CRM call intent generation system.

The examples of this disclosure detail activities of a Collections Analyst as a specific example of one type of enhanced CRM system. However, one of ordinary skill in the art, given the benefit of this disclosure will recognize that similar improvements may benefit any help desk administrator (regardless of specific role being performed) in completing their daily tasks. Specifically, a help desk administrator may need to prioritize across different internal customers having one or more open tickets. Additionally, the help desk administrator (or user of an enhanced CRM system) may benefit from disclosed concepts to reduce time lost due to focus changes between tasks.

Currently available methods and tools that are used by CRM systems, in general and specifically for a Collection Analyst, may help to an extent in collection activities. However, existing tools may not be actively participating in assisting the CRM user (e.g., with a collection activity or help ticket prioritization/follow-up). This disclosure describes improvements to systems of computers and other automated systems (e.g., telephone system) to provide a comprehensive solution to some of the above-mentioned problems. In particular, the disclosed system, at a high-level, represents an improved system (i.e., automation across and enhancements to multiple existing systems) that may provide "active assistance" and even guidance to customer facing individuals (e.g., Collection Analyst, help desk attendant, etc.) when performing daily activities.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
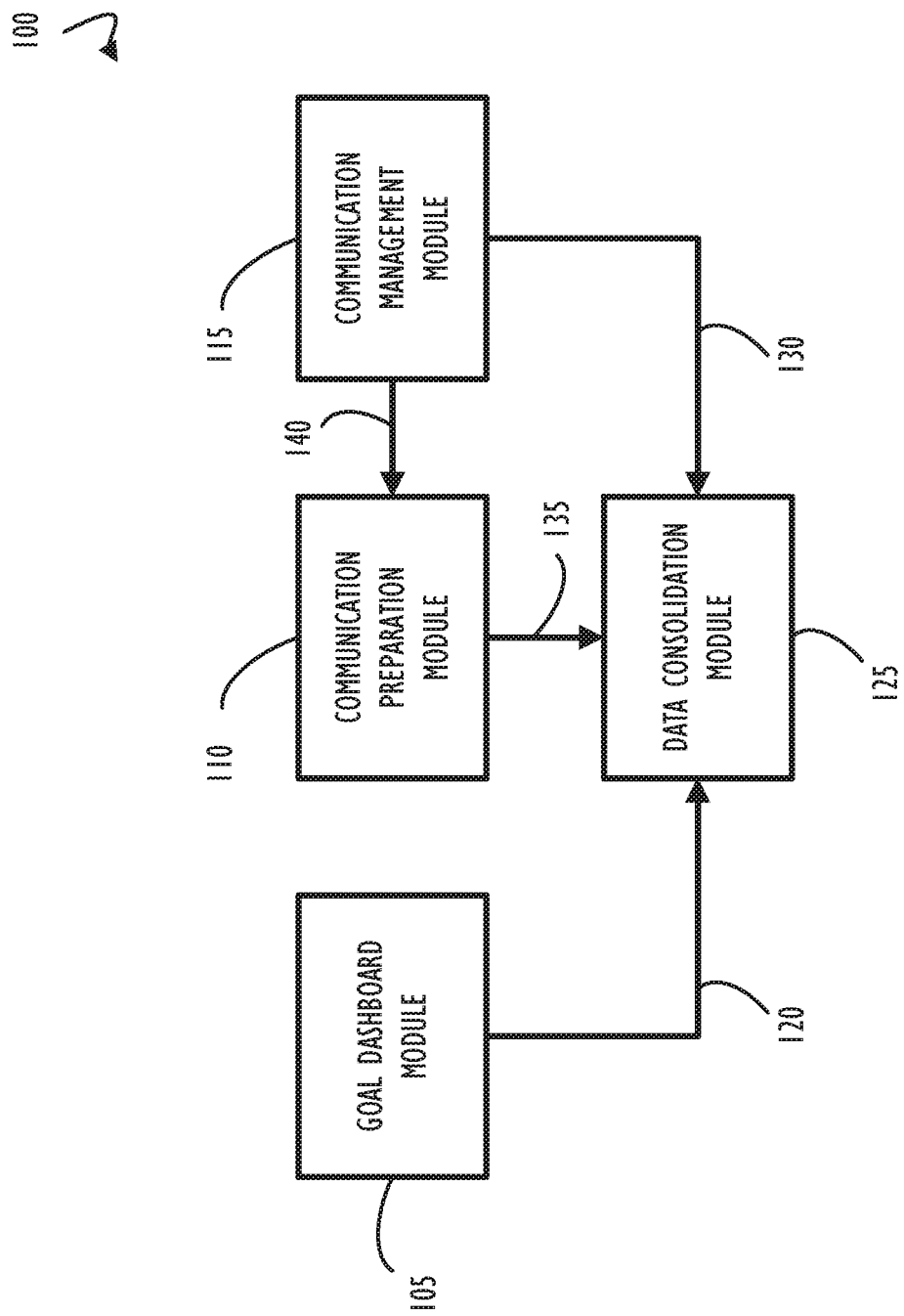
FIG. 1 is a functional block diagram representing the functional modules and their dependencies with respect to a system that integrates multiple tools used by a customer facing employee (e.g., Collection Analyst, help desk attendant), according to some disclosed implementations.

Illustrative examples of the subject matter claimed below will now be disclosed. In the interest of clarity, not all features of an actual implementation are described in every implementation described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In one example, Collection Analysts may contact a debtor with the primary intention to obtain a payment commitment or to understand why a payment has not been received. A Collection Analyst may contact multiple debtors each day. To facilitate these multiple contacts a Collection Analyst may utilize tools (e.g., an enhanced CRM system as outlined below) that may include a desk phone, a computer, a notebook, and other items and systems that may help in organizing the efforts to contact multiple consumers daily. Due to the nature of the multiple contacts, and within a single contact, a Collection Analyst may repeatedly switch their focus between different functions to perform tasks. Historically, these systems were not integrated into a comprehensive system. Tasks for each contact may include typing notes into a computer system designated for summarizing the call, interacting with a possibly different system for recording a debtor's promise to pay, or potentially using a third system for noting disputed amounts on the debtor's account. Between calls, the Collection Analyst may split their focus between the phone and the computer systems as they enter a phone number to initiate a call to a different debtor. Each time the Collection Analyst switches focus between tools, a delay in the Collection Analyst's activities may occur. For example, as the Collection Analyst re-orients their concentration to focus on a different tool (e.g., computer system). For enterprises with several Collection Analysts, that each have a large number of debtors to contact, the total time delay introduced by focus changes across all analysts may accumulate to several man-hours per month of non-productive time. Thus, an enhancement to reduce this delay may be provided by an improvement in automated system for customer interaction. As a result, the service provider may recognize a reduction in overhead (e.g., increase in employee efficiency).

Continuing with this example, a Collection Analyst may spend a significant amount of time researching which debtors to call. This time is also non-productive and may directly result reduction of an overall amount of money collected. Pre-call activities may involve researching notes of past attempts to contact the debtor to understand the best method for contacting a specific debtor. While most contacts are made through an email or a phone call, an analyst may assess if other contact methods such as postal mail or fax would be a more appropriate contact method. During this research, the analyst may make notes that may be used while communicating with a debtor (e.g., as part of pre-call planning) to be able to confidently discuss the debt with the debtor. If the Collection Analyst decides to contact the debtor through email, the email may be sent using the same program that is used for intra-company or personal email. Separating email messages related to debtor contact from message not related to collection activities may introduce further time delays in collection activities. Extra activity to organize email communication may be error prone if the communication is managed outside of the system that tracks collection activities.

From an implementation perspective, software applications utilized as tools to assist the Collection Analyst are typically driven by keyboard entry and mouse clicks. A Collection Analyst, as part of performing collection activities, may need to navigate through many screens while changing their hand positions between the keyboard and mouse. As the Collection Analyst is communicating with the debtor over the phone, the Collection Analyst may take extra time to find information related to a particular portion of the conversation with the debtor. The time needed to retrieve the information required may be increased due to input methods combined with software design that may not be optimized for the purpose of assisting the Collection Analyst.

A provider that has debtors, from which the provider needs to collect money, often wants to project a daily goal of how much of the debt they wish collect. As a method of assisting in meeting this goal, a Collection Analyst using the disclosed enhanced CRM system may be presented with a goal dashboard that summarizes the number of calls the Collection Analyst is scheduled to make for the day. The goal dashboard may present the Collection Analyst with a predicted number of hours that will be spent during the day contacting the debtor. This estimate may be determined, in part, by using machine learning algorithms that create the prediction using data collected during historical debt collection calls. The historical data assessed by the machine learning algorithms may include, but is not limited to, call times based on a classification of the type of debt, previous interactions with the individual debtor, historical call data collected for the Collection Analyst (e.g., a productivity measure for the customer facing Collection Analyst), and other external data sources including both private and publicly available data.

The goal dashboard may also present a summary of the amount of money that may be potentially collected for the day. This summary may be derived by, for example, a) a pre-determined pool of debtors assigned for the Collection Analyst to contact, b) the result of machine learning algorithms that have made a prediction based on historical data relevant to predicting the certainty of collecting a debt, or c) any other methods that may calculate an acceptable summary of the potential collection amount. In a help desk environment, a similar measure might be derived using a number and priority of tickets to be resolved within a time period (e.g., day, week, etc.).

As the Collection Analyst proceeds to make contact with debtors, the communication preparation module may show summary information with all information necessary to communicate the nature of the debt to the debtor. This information may include, but is not limited to, a credit profile of the debtor, a) historical payment behavior of the debtor, historical payment promises made by the debtor, b) a debtor's account balance summary that may include a breakdown of the time the current total owed has been outstanding, and c) history of communications with the debtor by any Collection Analyst. Some of the information that may be made available to the customer facing Collection Analyst may have a purpose of allowing the Collection Analyst to easily and efficiently discuss the debtor's historical contact record.

The communication preparation summary information may help the Collection Analyst prepare a strategy for communication with the debtor. Multiple strategies may be prepared and one selected based on a highest probability of resulting in obtaining a payment from the debtor. Additional information about the debtor may be presented that is derived using machine learning algorithms. The machine learning algorithms may have processed information pre-call and may continue to process information obtained during an actual customer contact (e.g., in near real-time while a call is in-progress). This additional information may be used by the Collection Analyst to impart on the debtor a more pleasant and personable conversation despite the potentially difficult discussion related to the debtor's debt. The information derived from machine learning algorithms may represent information that, for example, results from analysis on previous conversations with the debtors. Previous conversation analysis may be used, for example, to help the Collection Analyst avoid conversation subjects that triggered a negative response from the debtor. Machine learning algorithms may also use data sources such as the debtor's social media profiles to understand, for example, the debtor's hobbies and favorite TV shows. Thus, a Collections Analyst (e.g., customer facing employee) may have an opportunity to make a personal connection with the customer (debtor in this example). A personal connection may ease the tension of a debt collection interaction and/or enhance the experience of the overall contact for the customer.

In one example, data obtained from the debtor's social media profiles may be combined with other public sources of information that may allow the prediction of the best time to contact the debtor/customer. For example, it may be determined that it is best to contact the debtor concurrently when the end credits of their favorite TV show have started to scroll (e.g., at the end of the show). This time may reflect a time where the debtor/customer may be relaxed and willing to take a phone call (as opposed to during the middle of their favorite TV show). Prediction of the best time to contact the debtor/customer may have been determined, in part, by a machine learning algorithm. For example, the algorithm could determine the time to contact the debtor that results in the highest probability to make actual contact with the debtor/customer or based on an expected mood of the debtor/customer.

According to one example implementation of an enhanced CRM system (described in more detail below with reference to FIG. 1), when the Collection Analyst is prepared to contact a debtor, an integrated communications management module of the disclosed enhanced CRM system may manage the communications with the debtor. Thus, interfacing with multiple tools or systems may be avoided. Telephonic contact information may be stored as part of the debtor's profile. Telephonic contact information may also be used by the Collection Analyst to initiate a voice contact with the debtor. For example, the Collections Analyst may simply select a button to use one of potentially multiple contact numbers to automatically dial the debtor. Additionally, the disclosed enhanced CRM system may allow the Collection Analyst to utilize other automated controls to enter additional numbers needed to initiate contact. For example, an enhanced CRM system may be equipped to automatically navigate voice prompts (e.g., in the event that an automated system answers the phone). Thus, the enhanced CRM system may assist the Collection Analyst to navigate a menu of options presented by an automated answering system (e.g., through number entries) to achieve actual contact with the debtor/customer. Specifically, if the debtor is being called at a location where a phone switchboard requires navigation, the enhanced CRM system of this disclosure may automatically navigate that switchboard. Also, the disclosed enhanced CRM system, if not currently equipped to automatically navigate the switchboard, may "learn" how to navigate the switchboard by monitoring entries of the Collection Analyst. This learned navigation may be stored for use in a next contact attempt, for example. Still further, using the example communications management module, the Collection Analyst may add additional contact numbers to be stored in the debtor's profile for later use in contacting the debtor/customer.

In an example implementation of an enhanced CRM system, while the Collection Analyst is speaking with the debtor (e.g., in real-time or near real-time), the Collection Analyst may desire to perform some actions in an attempt to control the course of the telephone call. These actions may include, but are not limited to, placing the call on hold, muting the call, transferring the call to another Collection Analyst, or terminating the call. Many of these actions would typically be performed using a stand-alone desk telephone. However, disclosed implementations may incorporate these actions (and a telephone system in general) as part of, or interfaced to, the communications management module.

In an example implementation of an enhanced CRM system, if the Collection Analyst is speaking to a debtor that is in a locale that requires a notification when a conversation is recorded (e.g., local laws typically control right to record a phone call), the Collection Analyst may choose to enable the appropriate mechanism to notify the debtor that the call is being recorded. The notification that the call is being recorded may be, for example, a beep that is periodically sounded on the phone line so that it can be heard by both the Collection Analyst and the debtor. This mechanism for indicating the conversation is being recorded may apply for any type of method where the call is being recorded. The types of actions that may require notification include, but are not limited to, dialogue transcription, digital audio encoding and storage, or forwarding call audio to a third party that may be passively listening to the call.

Continuing with this example implementation, should the Collection Analyst be unable to contact the debtor via telephone, the communications management module may allow the Collection Analyst to generate a message for the debtor from an available set of message templates. Message templates may be a combination of static statements with references to debtor-specific contextual data that are used to form a message that may be communicated to a debtor. Variations of a single message template may include different language translations of the static statements while retaining the same or similar references to debtor-specific contextual data.

One example of a message template may be a simple static message that may include information that is intended to inform the debtor to return the call of the Collection Analyst. In another example, the message template may have a combination of static and dynamic information elements where the dynamic information elements may be provided at the time the message is sent to the debtor. Dynamic information elements may include, but are not limited to, a salutation proper for addressing the debtor, the amount the debtor owes, and the date by which payment is requested. The message may be delivered in text form via email, text message, or postal mail. Alternatively, the message may be delivered as a spoken message where the static and dynamic content may be encoded into speech (e.g., using text-to-speech or splicing audio fragments) by a computer before being transmitted to the debtor. Further, the above-mentioned static statements and contextual data may be managed as text (or digital audio fragments) within a computer system and automatically and cohesively translated and combined using text-to-speech and other capabilities of a computer to result a proper language and verbalization for a specific debtor/customer.

During a call between the Collection Analyst and the debtor, the communications management module may create a real-time textual transcription of the communication between the Collection Analyst and the debtor. The transcription provided by the communications management module may highlight important information as the transcript text is being displayed to allow the Collection Analyst to better assess the validity of the important information. The highlighted information in the call transcription may include, but is not limited to, dates and payment amounts, interesting personal information references, etc. The Collection Analyst may adjust the transcript in real time to ensure that the transcription is accurately capturing the call content and to make notes about the call content.

In one example, a customer may mention something that might otherwise appear innocuous to the Collection Analyst, however, the real-time textual transcription process may tie that innocuous statement to a portion of a previous call (or fact specific to this debtor/customer). Once a connection has been made, the enhanced CRM system may highlight the portion of the current call and provide information about the identified portion of the previous call or related information. In some cases, the Collections Analyst may determine that the identified related information is not currently pertinent or may further leverage the historical information. In one specific example, the debtor may be indicating that they don't remember ABC from a previous call. In this case, the system may automatically identify the ABC portion of the previous call and allow the Collections Analyst to "read back" the previous statements or otherwise "remind" the debtor of the circumstances surrounding ABC.

In some implementations, a voice navigation command module may be provided as part of an enhanced CRM system to augment manual navigation of screens otherwise performed manually by the Collection Analyst. For example, using a voice navigation command module configured to understand voice commands, the Collection Analyst may vocally request the system to show some requested information or locate a requested user interface for data entry. The voice navigation command module may operate as a user interface navigation tool that aids the Collection Analyst in avoiding manual interaction with the system (e.g., eliminate some use of a keyboard and a mouse). Further, a voice navigation command module may operate during a call to react to the conversation between the Collection Analyst and the debtor by retrieving and displaying information based on the call conversation. This operation may be performed in a similar manner to that described above with augmented transcript presentation. For example, when the Collection Analyst and the debtor discuss agreements made in a previous call, the voice navigation command module may make the call history of the debtor available for the Collection Analyst to view. A voice navigation command module may be tuned to only execute certain commands when the voice commands are issued by the Collection Analyst. That is, there may be voice recognition and command recognition/tuning based on context. In one specific example, the command to credit the debtor's account, would only be executed during a call between a Collection Analyst and a debtor if the command was given by the Collection Analyst.

Finishing this overview example, at the end of a call between a Collection Analyst and a debtor, the transcript of the call may be processed by machine learning algorithms to produce recommended actions that should next be taken by the Collection Analyst. Examples of actions may include: a) creating a follow up action to contact the debtor at a later date, b) record in the system the date and amount of a promised payment, or c) recommendations about special attention needed to address the debtor's account. These recommendations may be automatically executed or may be presented to the Collection Analyst for adjustment and execution approval (e.g., validation prior to storage). The Collection Analyst may optionally generate a summary email message from a message template that may contain a summary of the just completed call and the executed actions. The Collection Analyst may choose to attach a copy of the call transcript to the email message for the debtor's records. All information collected during the call may be stored as a historical record of contact with the debtor. Additionally, any stored historical record may provide input to other machine learning and data mining implementations such that further information (e.g., for future calls) may be derived.

The above description makes reference to the use of machine learning algorithms as a technique to create predictions that may be used in accordance with one or more examples. Machine learning algorithms, to make effective predictions, may need a source of data that assists in establishing patterns from which these predictions may be derived. The data sources may be any combination of data stored historically or may be provided as a source directly while data is collected and stored in real-time. Data may be any combination of structured, unstructured, or semi-structured data that may constitute binary record data, digital audio data, digital video data, or any other type of data relevant for any given machine learning algorithm. A machine learning algorithm may use more than one source of data as part of algorithms that analyzes data. The example sources of data mentioned in this disclosure are not intended to limit the types of data sources that may be used. It is generally understood that the variety and use of data sources as inputs to machine learning and data mining techniques is virtually unlimited.

Having an understanding of the above overview, this disclosure will now explain a non-limiting but detailed example implementation. This example implementation is explained with a use-case of a Collections Analyst or Help Desk Attendant and may also be applicable, in full or in part, to other customer facing users of an implementation of the enhanced CRM system of this disclosure. The examples are provided with reference to the figures that include: a functional block diagram representing the functional modules and their dependencies of a system that integrates the tools used by a Collection Analyst (FIG. 1); a functional block diagram representing a module that embodies software that generates a goal dashboard for the Collection Analyst (FIG. 2); a functional block diagram representing the communication preparation module that provides guidance to the Collection Analyst while in contact with a debtor (FIG. 3); a functional block diagram representing the communications management module that facilitates the communication between the Collection Analyst and a debtor (FIG. 4); a functional block diagram representing a system module that consolidates the data of debtor history and all contact activity between the Collection Analyst and a debtor (FIG. 5); a block diagram illustrating a comparison of the inefficient tasks executed by a Collection Analyst without the benefit of this disclosure and the efficiency gained by the methods of this disclosure (FIG. 6); an example process followed by a Collection Analyst utilizing the techniques and methods described in this disclosure (FIG. 7); an example computing device with a hardware processor and accessible machine-readable instructions that might be used to run the software embodiment of the techniques and methods described in this disclosure (FIG. 8); a computer network infrastructure that may be used to implement all or part of the disclosed techniques and methods, according to one or more disclosed implementations (FIG. 9); and a computer processing device that may be used to implement the functions, modules, processing platforms, execution platforms, communication devices, and other methods and processes of this disclosure. The examples provided in FIGS. 6 and 7 refer specifically to a Collection Analyst but may also be generally applicable to other customer facing CRM system users. To be clear, although examples are provided with a use-case of a Collection Analyst and debtor interaction, each disclosed technique may be applicable to different implementations of other systems used to control interaction between a customer facing individual and a customer.

Referring to FIG. 1, system functional modules 100 and one example of their respective interactions and dependencies are shown as a functional block diagram. Goal dashboard module 105 may present a summary of the daily goals of a Collection Analyst. The summary data may be obtained by goal dashboard module 105 by retrieving data from data consolidation module 125 via a communication link established as part of the indicated module dependency 120. Communication preparation module 110 may present the summary information of the debtor that the Collection Analyst is preparing to contact. Data that is used to compose the summary information of the debtor may be retrieved from data consolidation module 125 via a communication link established as part of the indicated module dependency 135. Communication management module 115 may be used by a Collection Analyst to execute communication activities with a debtor that may include communication via phone, email, or any other method of communication. Communication management module 115 may utilize data retrieved from communication preparation module 110 via a communication link established as part of the indicated module dependency 140 to assist the Collection Analyst to determine the method of contact that may result in the highest probability of contacting the debtor. Communication management module 115 may also store data collected during the call in data consolidation module 125 via a communication link established as part of the indicated module dependency 130. Data stored in data consolidation module 125 may be, for example, a digital audio recording of the call, a text transcription of the call, notes created by the Collection Analyst during the call, or any other data that may be collected while the Collection Analyst is communicating with the debtor.

Figure 2:
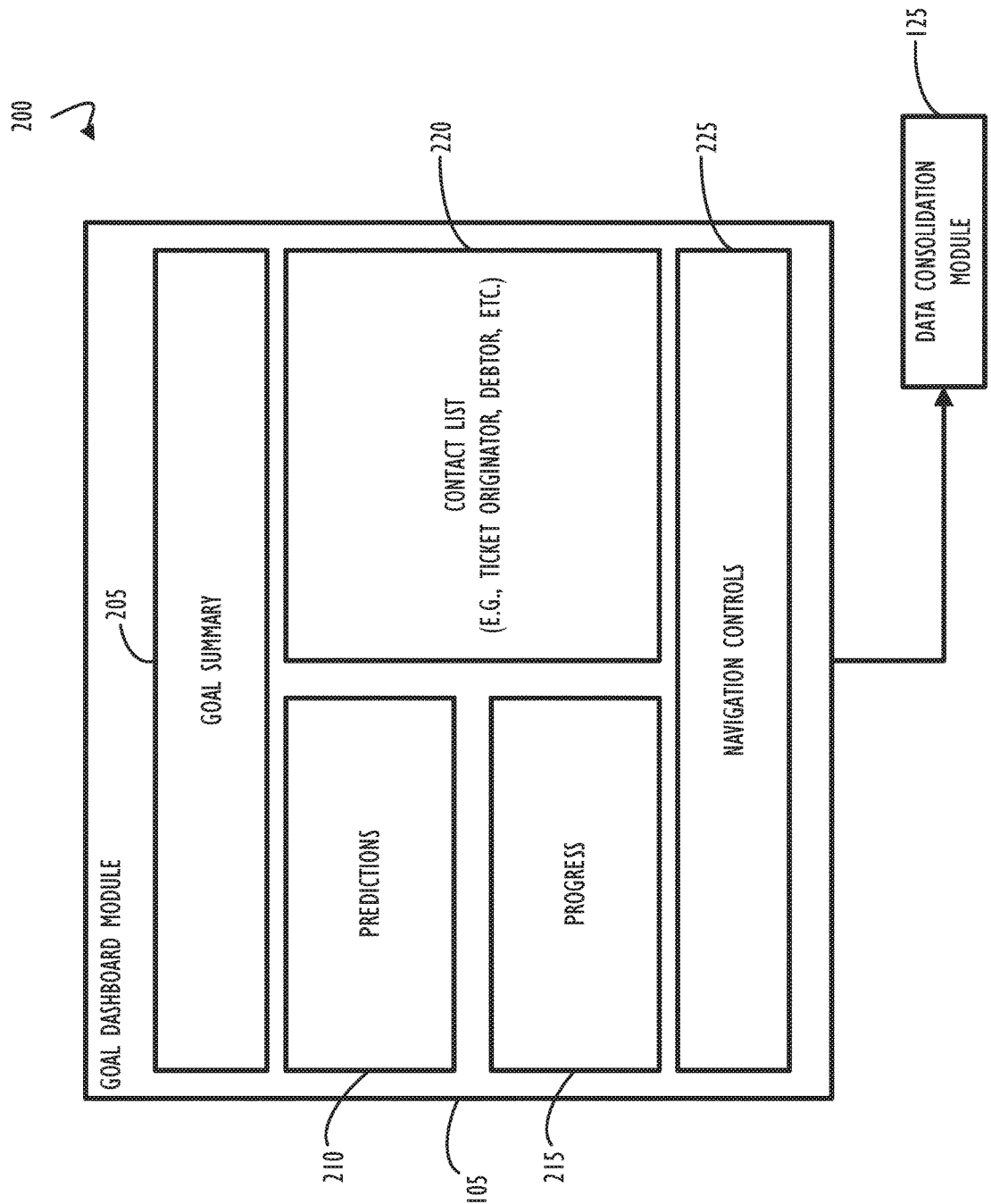
FIG. 2 is a functional block diagram representing a module that embodies software that generates a goal dashboard for the customer facing employee (e.g., Collection Analyst, help desk attendant), according to some disclosed implementations.

Referring now to FIG. 2, goal dashboard module 105 is illustrated as a further collection 200 representing a subset of all modules within an enhanced CRM system and is shown as a functional block diagram including an interface to data consolidation module 125. Goal dashboard module 105 may display summary information in a summary region such as goal summary 205 that may have been obtained from data consolidation module 125. Goal summary 205 may include information about the daily collection amount goal, a minimum number of calls to reach that goal, summary of the current day's progress, or any other pertinent summarized information related to a Collection Analyst's collection efforts. In the context of help desk tickets, similar goal related information may be presented as part of a tailored dashboard for their particular goals (e.g., tickets to close or address). Predictions 210 represents a display region that may present predictions that are created by machine learning algorithms. The machine learning algorithms may create predictions, for example, based on analysis of historical debt collection efforts associated with the customers intended to be contacted by the Collection Analyst in a work period (e.g., day, week, by end of month, etc.). Predictions 210 may also display a number of debtors the Collection Analyst is expected to call within a work period, the amount of time that may be spent on each call, a measure of "certainty" that the Collection Analyst will meet a daily collection goal, or any other predicted value that may be useful for a Collection Analyst.

As the Collection Analyst progresses in executing collection efforts, individual progress may be displayed in a display region indicated as progress 215. Progress 215 represents a display region that may show the number of debtors contacted, the amount of money collected, or any other progress information that may be useful for a Collection Analyst. Debtors, that have been automatically selected for the Collection Analyst to contact, may be displayed in contact list 220. Contact list 220 may be presented on a potentially separate part of a given user interface (e.g., graphical user interface (GUI)). The Collection Analyst may use navigation controls as indicated by navigation controls 225 to navigate to views provided by other modules (e.g., from FIG. 1) that may allow the Collection Analyst to execute other actions related to executing collection activities.

Figure 3:
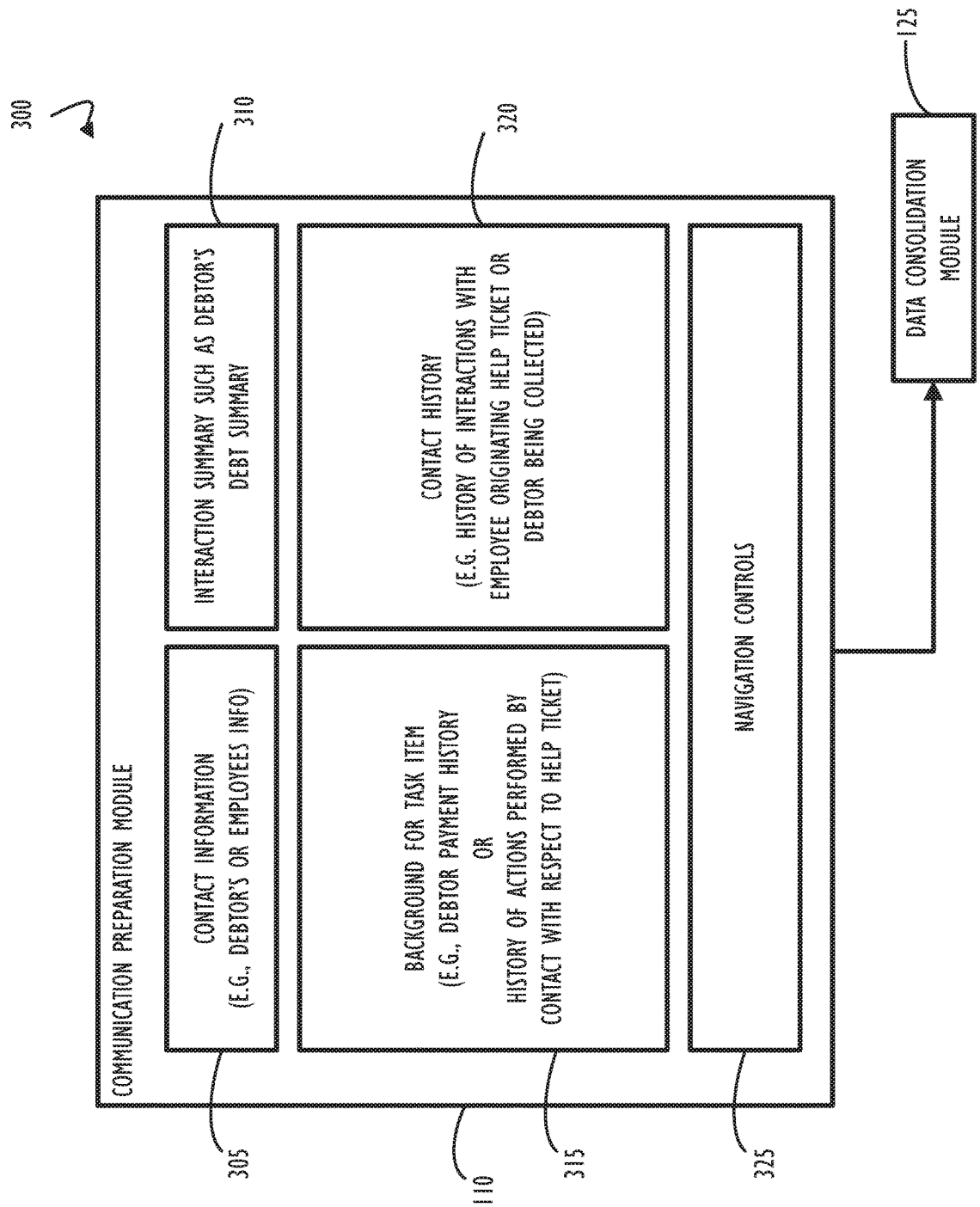
FIG. 3 is a functional block diagram representing the communication preparation module that provides guidance to the customer facing employee while in contact with an internal or external customer (e.g., debtor or ticket generator), according to some disclosed implementations.

Referring now to FIG. 3, communication preparation module 110 may be used to render communication preparation interface 300 that is shown as a functional block diagram that includes an interface to data consolidation module 125. For example, after retrieving relevant data from data consolidation module 125, contact information 305 may be presented as a display region that provides contact information 305 for the debtor (or ticket originator in a help desk implementation). This contact information 305 may include: a) one or more phone numbers where the debtor may be contacted, b) a debtor's email address, or c) any other contact information that may be useful when a Collection Analyst attempts to contact a debtor. Interaction summary 310 represents a display region that may include a debtor's debt summary on the context of a Collection Analyst interface. Interaction summary 310 may display the amount the debtor owes as well as the time duration for which the debt has been outstanding in a Collection Analyst interface. Correspondingly in the context of a help desk attendant, a help desk attendant interface may include an interaction summary 310 that may include a number of open and previously closed tickets for a given employee. Interaction summary 310 for a help desk attendant interface may also display a number of outstanding tickets and their respective duration outstanding.

The background for task item 315 may include a debtor's payment history for a Collection Analyst. Contact history 320 may be displayed for use, in real-time, by the customer facing user of an enhanced CRM system while contacting the debtor/customer. Historical reference information such as that displayed in background for task item 315 and contact history 320 may be used by the Collection Analyst to, for example, explain historical payments and notes related to previous contacts with the debtor. The Collection Analyst may use navigation controls displayed in navigation controls 325 to navigate to views provided by other modules that may allow the Collection Analyst to execute other actions related to performing collection activities.

Figure 4:
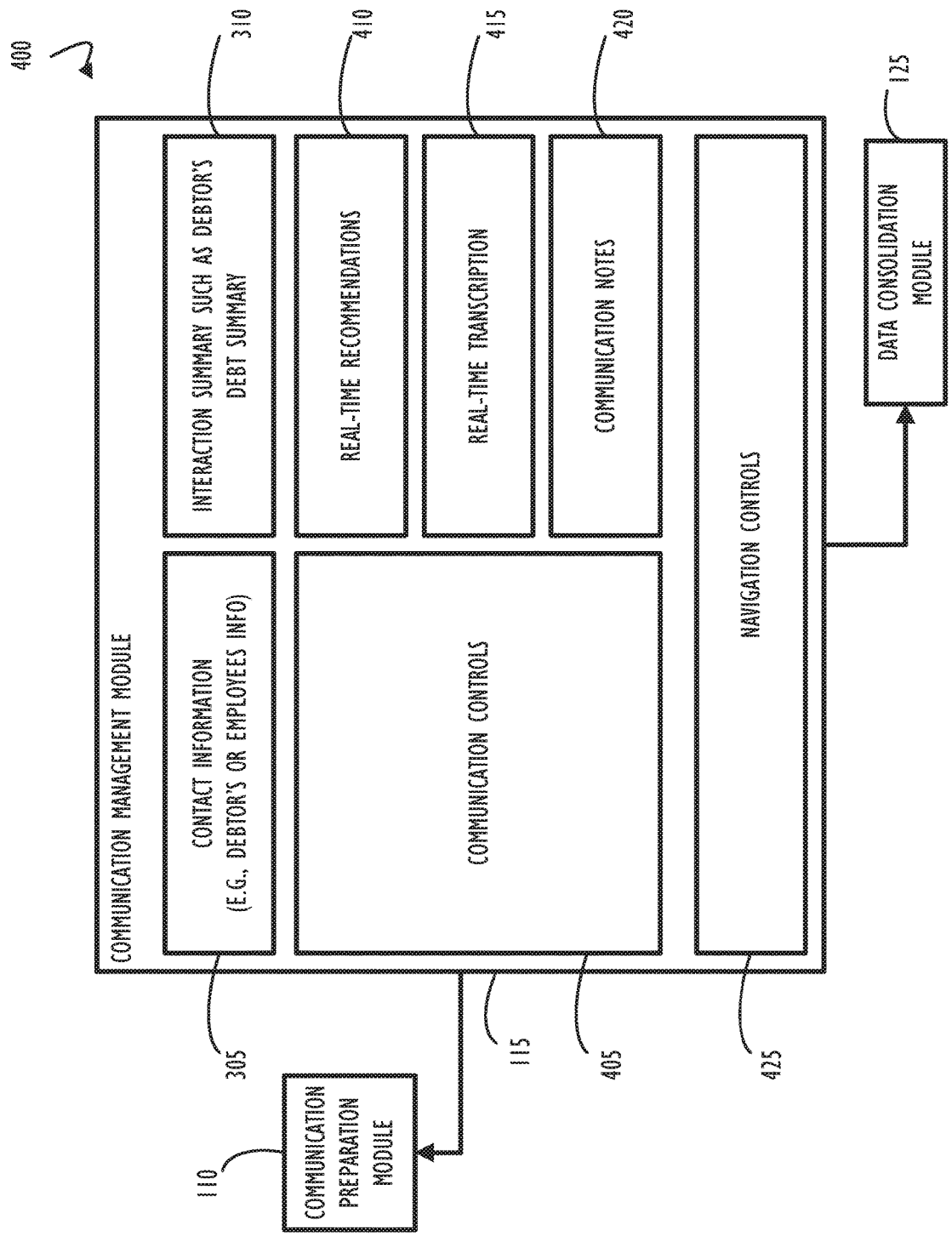
FIG. 4 is a functional block diagram representing the communications management module that facilitates the communication between the customer facing employee and the customer (e.g., between a Collection Analyst and a debtor), according to some disclosed implementations.

Referring to FIG. 4, communication management module 115 may be used to render communication management interface 400, which in this example is illustrated as a functional block diagram and includes interfaces to communication preparation module 110 and data consolidation module 125. Contact information 305 (e.g., debtor contact information) and interaction summary 310 (e.g., debtor debt summary) may be obtained from communication preparation module 110. This information may be displayed to allow the Collection Analyst to maintain a context for communication with the debtor. Communication controls 405 may allow the communications with the debtor to be initiated and controlled for the duration of the communication session with the debtor. Communication controls 405 may include actions such as phone dialing, automatic dialing of a debtors contact phone numbers, call muting, and other capabilities that may be useful in controlling the communication may be used by the Collection Analyst.

For example, data collected during a call, that may include a digital audio recording of the call, may be stored at the direction of data consolidation module 125 (e.g., while a call is in progress, portions may be stored for analysis). During a call, real-time recommendations 410 may be retrieved, for example, from data consolidation module 125. Recommendations 410 may be displayed, for example, if information has been automatically determined relevant to the discussion currently taking place between the Collection Analyst and debtor. Real-time recommendations 410 may also include suggestions that may be related to the subjects currently (or just previously) under discussion in the call and may be generated by machine learning algorithms that are monitoring the call. For example, when the debtor and Collection Analyst are discussing payment, the machine learning algorithm may recommend the Collection Analyst suggest allowing the debtor to make multiple smaller payments rather than one large payment. Real-time transcription 415 of the call may display the text of the words spoken during the call. The transcript may have important information such as payment amounts and dates highlighted to allow the Collection Analyst to easily verify payment details.

The Collection Analyst may transcribe notes using user interactive controls in communication notes 420 region. The Collection Analyst may use navigation controls displayed in navigation controls 425 to navigate to views provided by other modules. In this manner, navigation controls 425 may allow the Collection Analyst to execute other actions related to executing collection activities.

Figure 5:
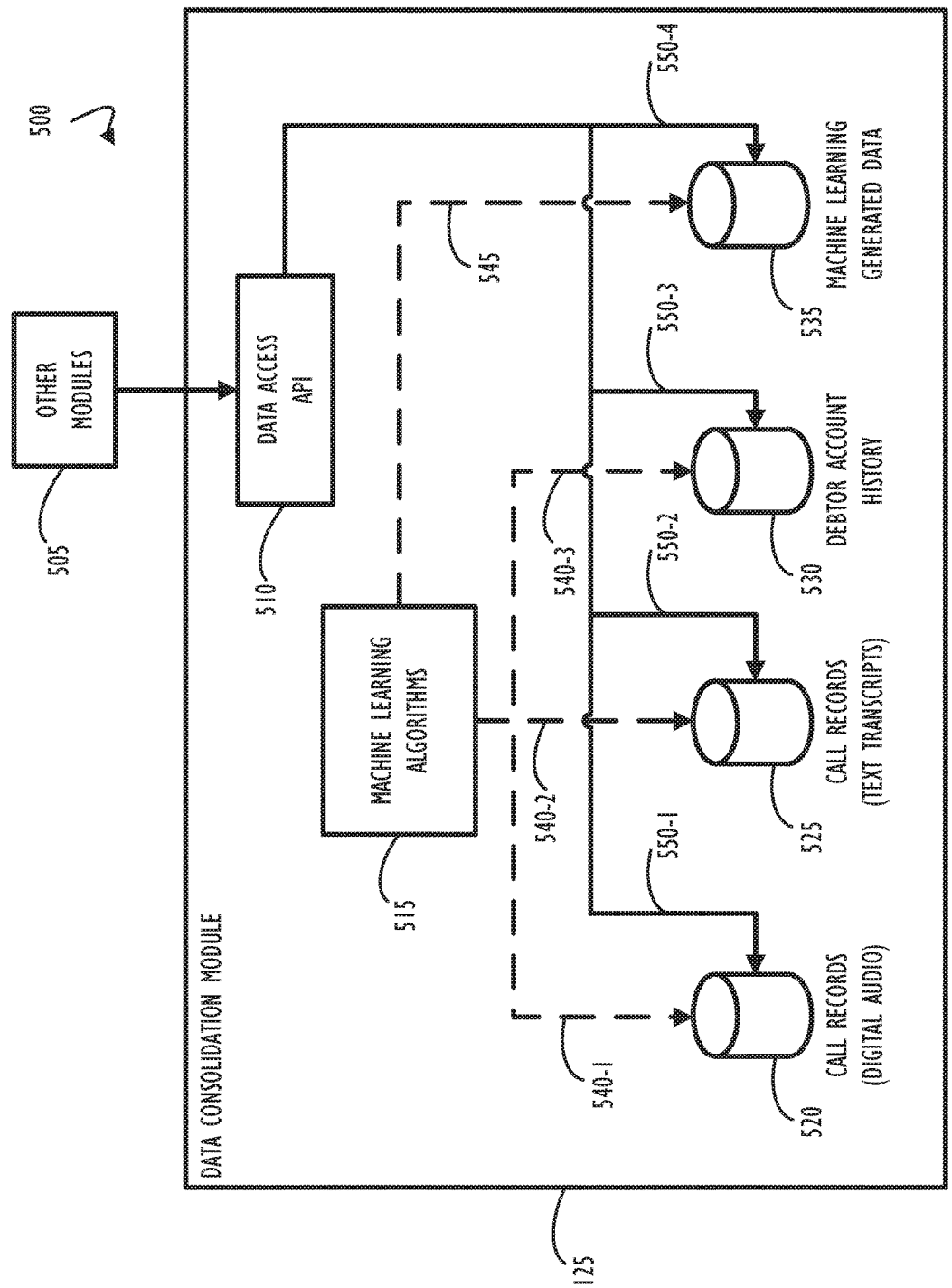
FIG. 5 is a functional block diagram representing a system module that consolidates the data of interaction history and all contact activity between the customer facing employee and customer (e.g., between a Collection Analyst and a debtor), according to some disclosed implementations.

Referring to FIG. 5, data consolidation module 125 is shown as a functional block diagram 500 to illustrate possible details that may be present in such a module and to illustrate an interface to other modules 505. In this example, data consolidation module 125 may aggregate multiple data sources such as digital audio recording of calls 520, text transcripts of calls 525, debtor account history 530, and data generated from machine learning 535. Example data sources are not to be considered limiting and not intended to limit data communication module 125 from aggregating any other relevant data source. Data consolidation module 125 may provide data to other modules 505 through communication links or via data access application programming interface (API) 510. Data access API 510 may provide or receive data from other modules 505 by linking to any aggregated data source through communication links (illustrated as communication links 550-1, 550-2, 550-3, and 550-4) that are appropriate for accessing data. Communication links may be network communication links or programming interfaces depending on implementation criteria.

Machine learning algorithms 515 may execute as part of data consolidation module 125 by accessing data sources through links 540-1 through 540-3 (illustrated as links 540-1, 540-2, and 540-3). Techniques for accessing the data sources through links 540-1 through 540-3 may be similar to techniques used via links 550-1 through 550-4 as it pertains to communicating with a data source. In general, these links may represent network communication or inter-module communication on a computer system such as are known to those of ordinary skill in the art. For example, socket communication, parameter passing, network communication, application program interfaces, etc. Machine learning algorithms 515 may use links 540-1 through 540-3 to read data from data sources. For example, machine learning algorithms 515 may read data as part of processing predictions that may be written to another data source 535. Data source 535 may be accessed, for example, via link 545.

Figure 6:
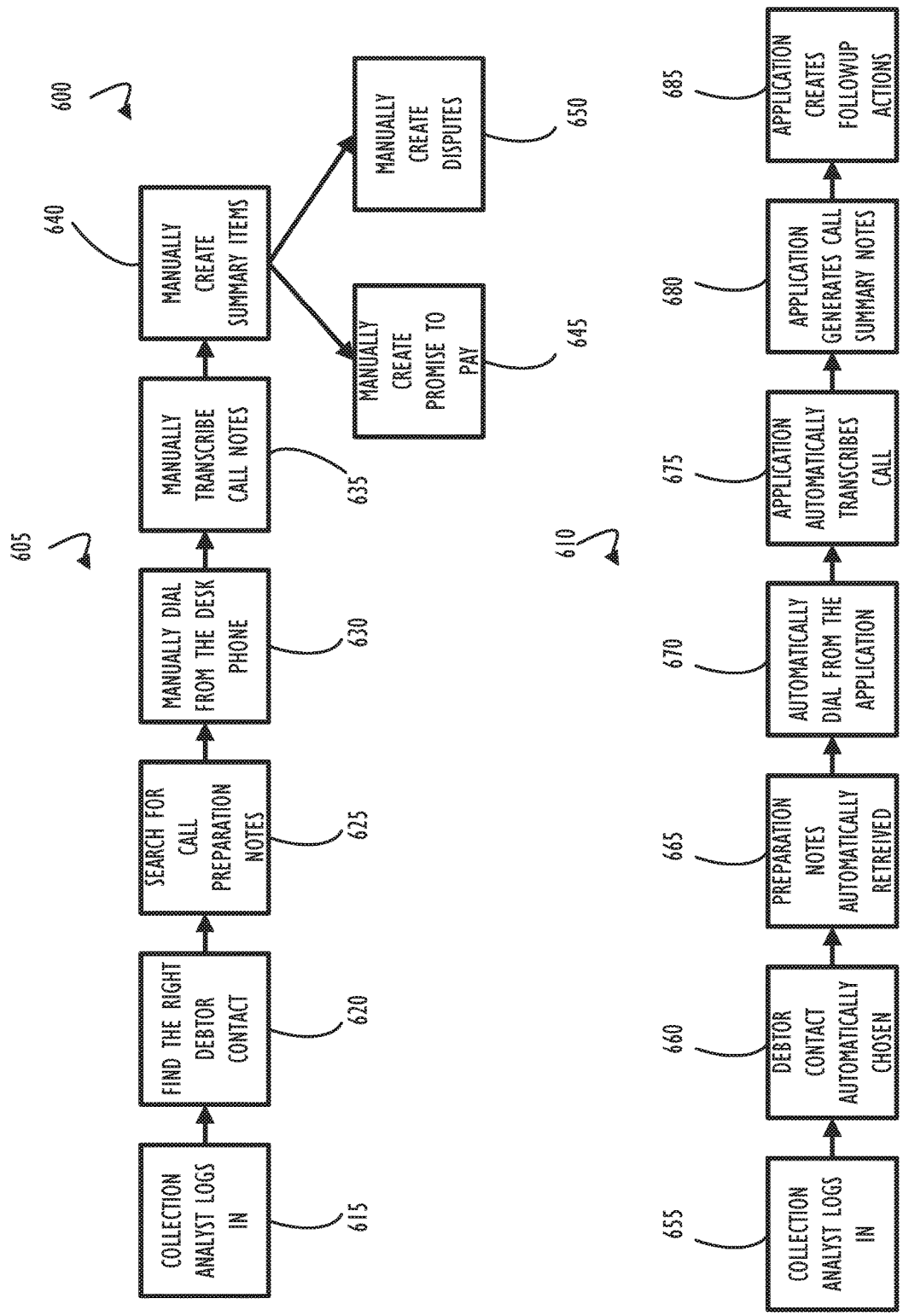
FIG. 6 is a block diagram illustrating a comparison of some inefficient tasks historically executed by a Collection Analyst (e.g., without the benefit of this disclosure) and identifies potential efficiency gained based on this disclosure, according to some disclosed implementations.

Referring to FIG. 6, two related workflows 605 and 610 are illustrated in comparison view 600. Comparison view 600 illustrates inefficient view 605 relative to efficient view 610. For example, efficient view 610 may be possible for systems implemented utilizing one or more techniques of this disclosure. Inefficient workflow steps 605 illustrate the Collection Analyst logging into the system as a first step 615. The Collection Analyst then may spend time finding the correct debtor to contact, as illustrated by block 620. Having chosen a debtor to contact, the Collection Analyst may then proceed to activities such as searching for call preparation notes, as illustrated by block 625. Notes that may be desired for preparation may take a significant amount of time to find and review prior to a Collection Analyst being prepared to contact the debtor. Once the Collection Analyst is prepared, they may proceed to block 630 to interact with their desk phone to contact the debtor. As the call progresses, the Collection Analyst may manually transcribe notes as illustrated in block 635. Transcription may involve a combination of hand-written notes on paper or notes types into the computer. At the end of the call with the debtor, block 640 indicates that the Collection Analyst may manually review notes transcribed during the call to manually create summary notes that are maintained as part of the debtor's contact history. The Collection Analyst may also notate promises to pay or debt disputes as illustrated by blocks 645 and 650, respectively. Notations of promises to pay or debt disputes may have to be entered into different systems or through different interfaces for a non-integrated CRM system.

As a comparison, some systems built in accordance with techniques of this disclosure may be represented by efficient workflow 610. Efficient workflow 610 also begins where the Collection Analyst logs into the system, as illustrated by block 655. However, in this example implementation, an application of the disclosed enhanced CRM system automatically selects a debtor to contact 660 and call preparation notes 665 may be automatically presented to direct the Collection Analyst activity. For example, based on the Collection Analyst login id, the system may have determined tasks for which that Collection Analyst is assigned at the current time. Thus, upon recognition of login, the proper task item for the Collection Analyst to address may be automatically displayed. An enhanced CRM system in accordance with disclosed techniques, may be automatically managing and selecting which tasks should be assigned to which Collection Analyst in an effort to maximize productivity across the entire organization.

Continuing with the example if efficient workflow 610, when the Collection Analyst is ready to contact the debtor, block 670 indicates that the Collection Analyst may have the data tracking application automatically initiate a phone connection with the debtor. Automatic initiation of contact, as discussed above, may include automatically navigating a remote switchboard. An enhanced CRM system may automatically transcribe the call between the Collection Analyst and the debtor, as indicated by block 675. At the end of the call, the enhanced CRM system may automatically generate and consolidate all call summary notes (as indicated at block 680). Finally, follow-up actions may be automatically created (e.g., from the summary notes and transcript), as indicated at block 685.

Figure 7:
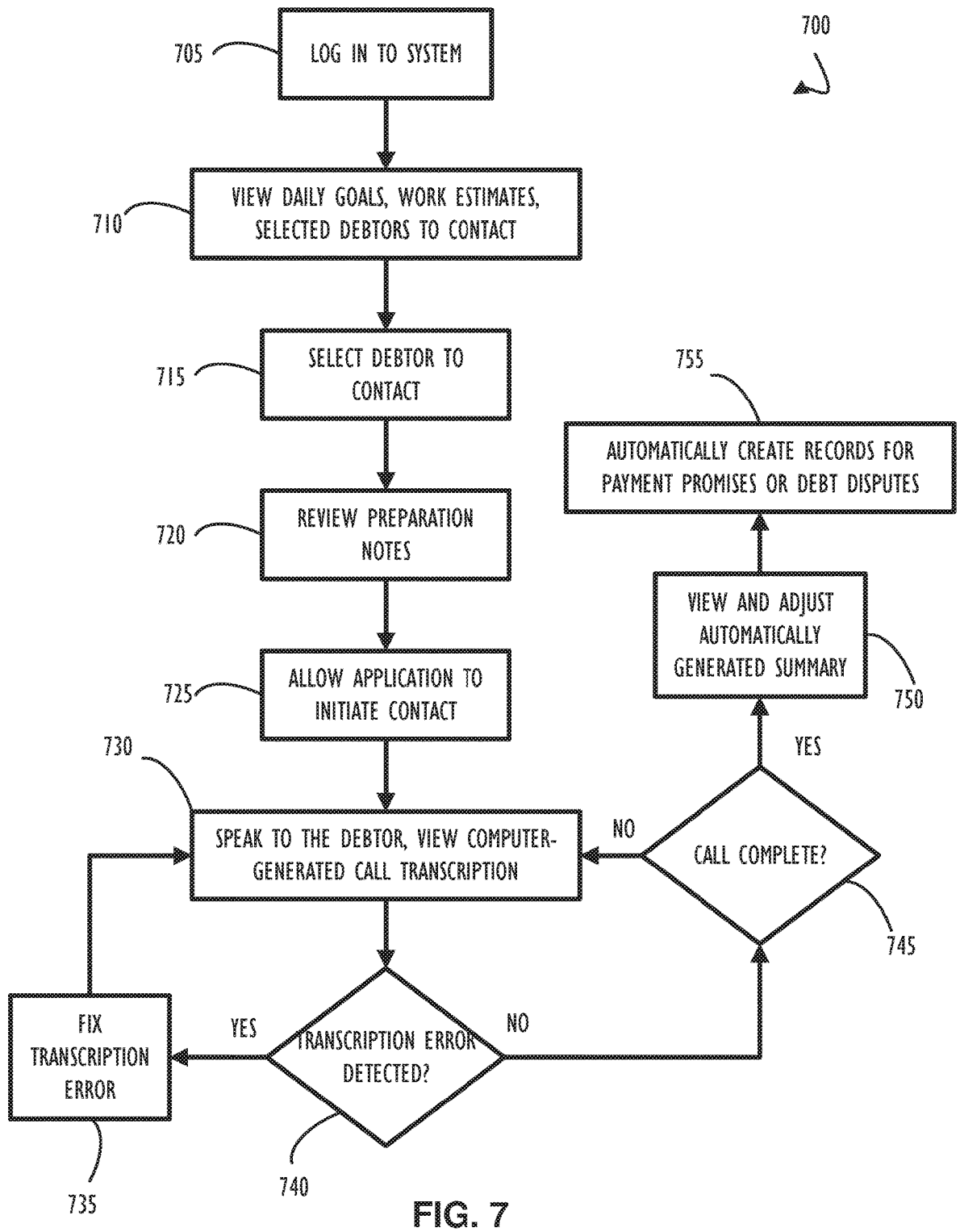
FIG. 7 is an example process followed by a Collection Analyst, as an example enhanced CRM system user, taking advantage of the techniques, methods, and systems described in this disclosure, according to some disclosed implementations.

Referring to FIG. 7, an example process followed by a Collection Analyst is illustrated as example method 700. Example method 700 includes a flow that may be automated and performed, in whole or in part, by a computer system configured in accordance with disclosed techniques. Example method 700 begins at block 705, the Collection Analyst (or help desk attendant) may log in to an enhanced CRM system to establish a context in an application where data is retrieved that is relevant to the logged-in Collection Analyst. Continuing to block 710, the Collection Analyst may view daily goals, work estimates, and review debtors selected for contact. Continuing to block 715, the Collection Analyst may select a debtor to contact. Flow continues to block 720 where the Collection Analyst may review the call preparation notes. When the Collection Analyst is prepared to contact the debtor, example method 700 continues to block 725 to automatically initiate contact with the debtor (e.g., a call may be automatically dialed based on an initiation from an enhanced CRM system). Continuing to block 730, the Collection Analyst and the debtor speak on the call. During the call (e.g., while the call is actively taking place), a transcription of the call may be automatically created by one or more functional modules of an enhanced CRM system. The Collection Analyst may review the transcription. For example, the transcription may be checked for errors during the call to arrive at decision 740. If an error is encountered in the transcription, the YES prong of decision 740, flow continues to block 735 where the transcription error may be corrected. After fixing the transcription error, example method 700 returns to block 730 to continue the call between the Collection Analyst and debtor. However, should the evaluation of transcription errors in block 740 not result in the need to fix any errors, the NO prong of decision 740, flow continues to decision 745. Upon arrival at decision 745, if the call is not complete, the NO prong of decision 745, flow returns to block 730 and the call continues. However, if the call is complete, the YES prong of decision 745, flow continues to block 750 where the Collection Analyst may view and adjust any automatically generated call summary. Finally flow of example method 700 continues to block 755, where records for payment promises or debt disputes may be automatically created and stored within the appropriate data stores of the enhanced CRM system.

Figure 8:
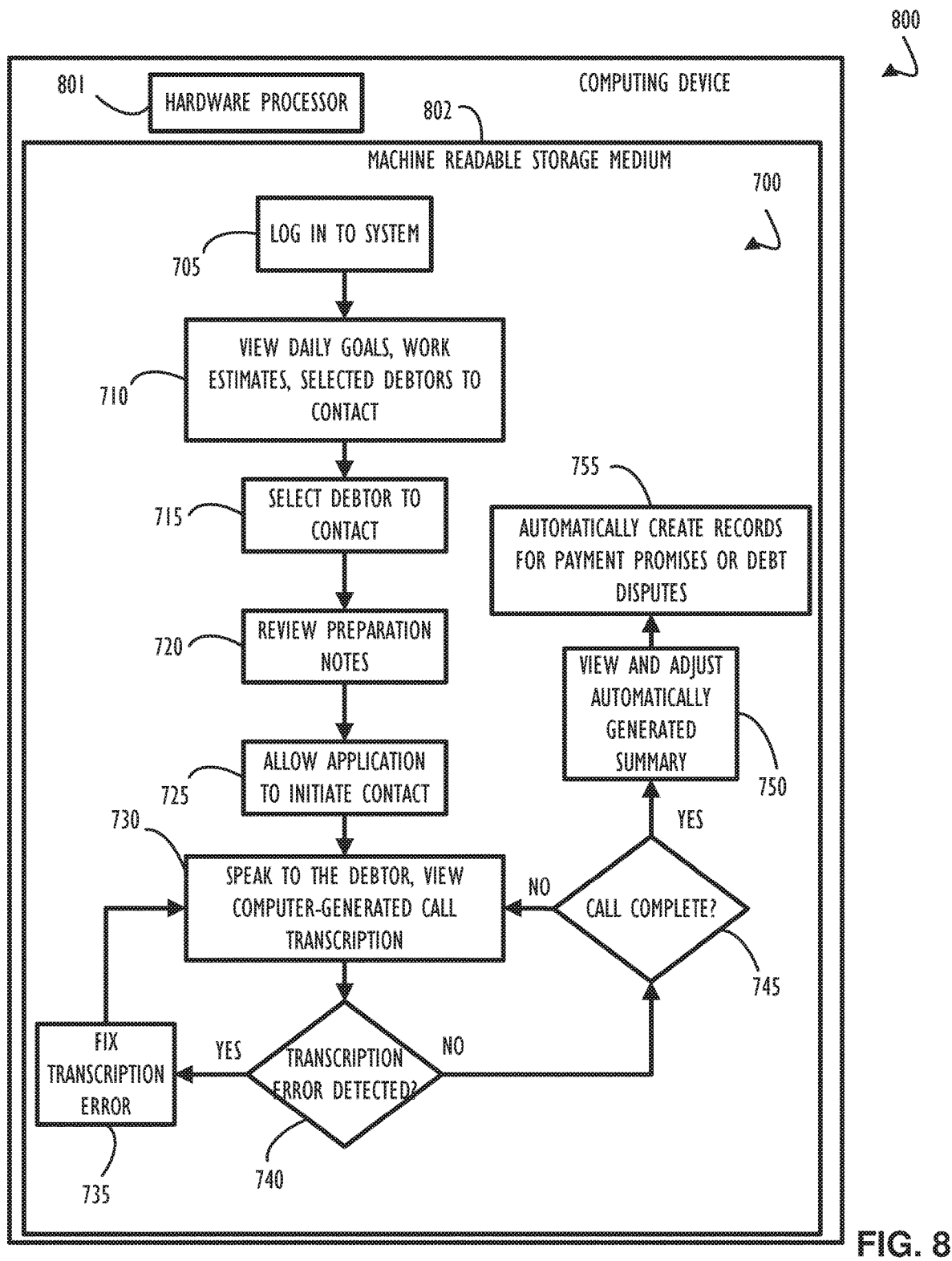
FIG. 8 is an example computing device with a hardware processor and accessible machine-readable instructions that might be used to run a software embodiment of the techniques and methods described in this disclosure, according to some disclosed implementations.

FIG. 8 is an example computing device 800, with a hardware processor 801, and accessible machine-readable instructions stored on a machine-readable medium 802 that may be used to execute the processes and methods of this disclosure, according to one or more disclosed example implementations. FIG. 8 illustrates computing device 800 configured to perform the flow of method 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 705-755 discussed above with reference to FIG. 7.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
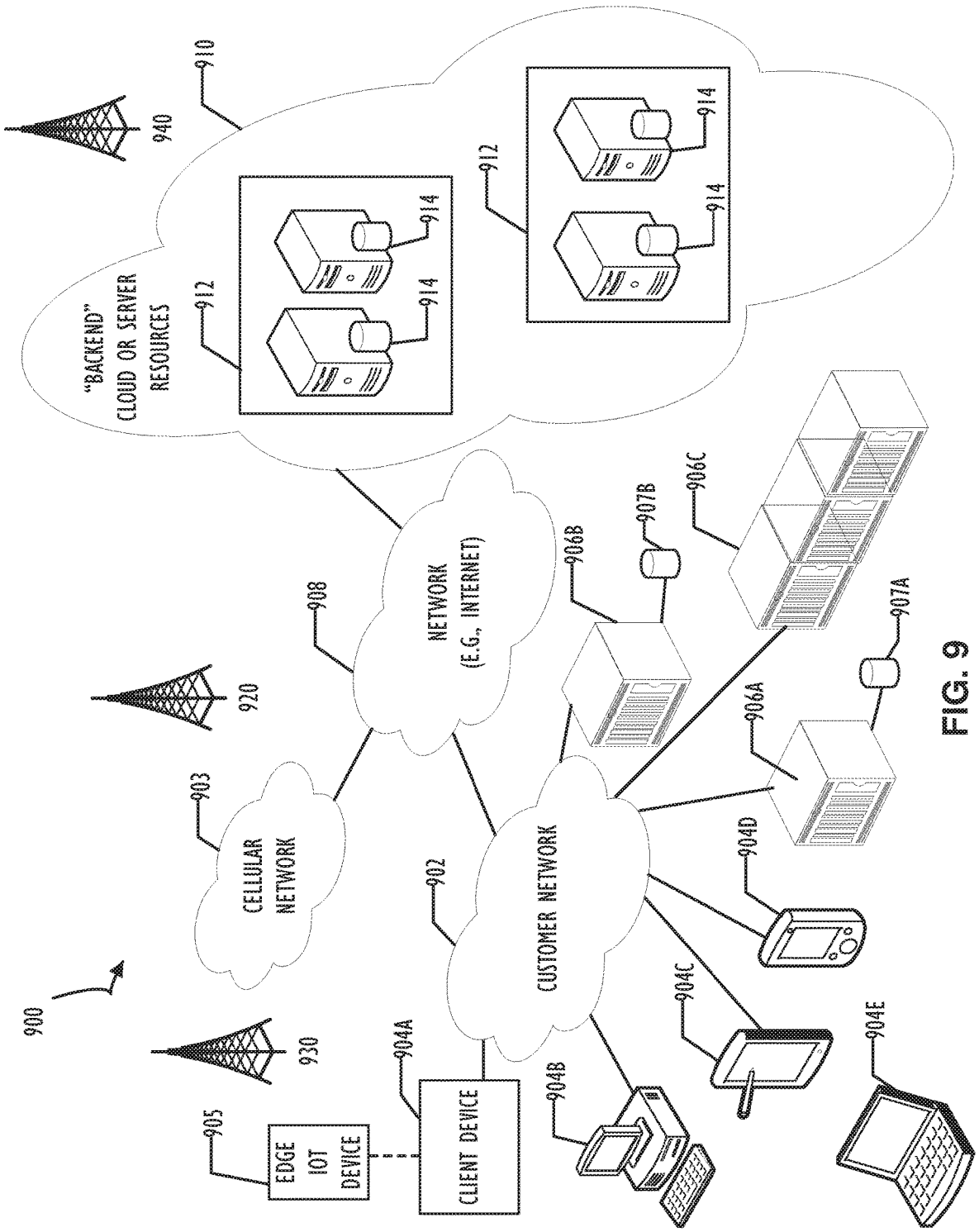
FIG. 9 represents a computer network infrastructure that may be used to implement all or part of the disclosed techniques and methods, according to one or more disclosed implementations.

FIG. 9 represents a computer network infrastructure that may be used to implement all or part of the disclosed enhanced CRM call intent generation techniques, according to one or more disclosed implementations. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with the software implementing the disclosed techniques such as those described above. Also, one of the many computer storage resources in customer network 902 (or other networks shown) may be configured to act as a data source used, for example, by data consolidation module 125 of FIG. 5.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices used by a Collection Analyst as part of contacting and interacting with debtors. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an enhanced CRM system built in accordance with this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914.

Figure 10:
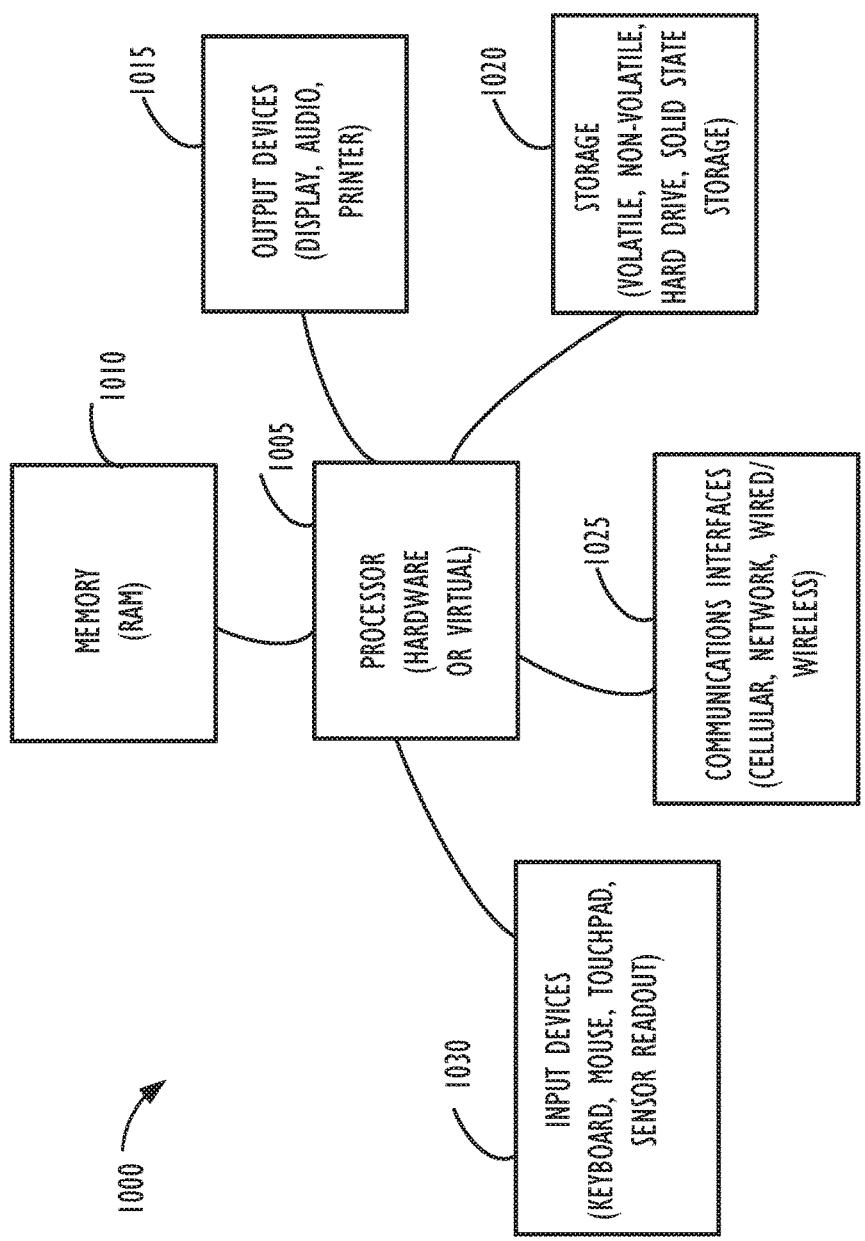
FIG. 10 illustrates a computer processing device that may be used to implement the functions, modules, processing platforms, execution platforms, communication devices, and other methods and processes of this disclosure.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

To summarize possibilities for different implementations at a high-level, disclosed systems may determine a priority for a customer facing user of an enhanced CRM system based on a login of an identified user to the system. The system, upon login, may determine a required amount of work for a collection analyst and informs the analyst of this information. That is, the system may set a daily goal for the collection analyst with respect to an amount of money they must obtain. There may be a second goal set for the amount of money for which the collection analyst obtains a promise to pay. In the help-desk scenario, the goal may be a number of tickets to address or a goal derived from a raw number of tickets weighted by their priority and importance. The priority factor could be a severity level associated with the ticket and the importance could be determined based on number of users impacted or the title (e.g., president, director, vice-president) of at least one person impacted. In a case where title of person impacted is considered, the system may be considered to account for "political cost" within an organization.

The system may utilize machine learning trained based on the past performance of the analyst and expected call times for data correlated to each call that needs to be made through predictive machine learning algorithms. Thus, a productivity measure for a given time period may be used to set an expected goal and a desired goal. In this system with two (or more goals) the user may be incentivized to reach their expected goal (or stay at work longer for example) and may be rewarded by reaching their desired goal. Thus, the disclosed system may have checks and balances to identify poor performers and reward high performers while taking into account attributes of the target customer based on historical information about the target customer. Specifically, some target customers may have an increased difficulty factor than others and thus getting anything positive out of a difficult target customer would represent a heightened accomplishment over getting something out of an easy target customer. Further, only proficient collection analysts (as opposed to new-hires or questionable performers) may be automatically selected and assigned calls to difficult customers. Many different implementations become possible with a goal toward making the overall collections team as efficient from an organization perspective as possible.

The disclosed system may be considered to provide information in at least three phases of: a) before a contact; b) during a contact; and c) post contact. As explained above, before a contact the disclosed system may provide scheduling guidance, goal setting, call preparation, etc. Activities that may be performed during a contact may include initiating the contact. These activities automatically performed for the contact may be considered to assist the efficiency of the collections analyst or help desk attendant (i.e., customer facing user of an enhanced CRM system).

Activities performed during a contact may be considered to include the concepts described above, obvious variants thereof, and at least the following: a) auto navigation of remote switchboard (voicemail); b) validation of appropriate contact time (that was determined at some point pre-contact); c) automatic acknowledgement and notification based on legal recording requirements of target customer; d) determination of current locality of target customer (e.g., for use in determining received contact time and local laws); e) automatic transcription and guidance based thereon; f) automatic transcription and association to historical information or social media information associated with current call topics; g) automatic determination of previous information to remind a target customer; h) presentation of a summary of particulars of the case including aspects highlighted based on machine learning; and i) voice navigation through computer interface screens or commands securely protected via voice recognition.

Activities performed post contact may be geared toward allowing a collection analyst to efficiently complete a contact and properly transition to a next target customer contact. Post contact activities may include storing information from the contact just completed automatically in an appropriate location (or multiple locations) to alleviate historically manual activities of recording call results. For example, because of a real-time transcription and voice recognition thereof, the disclosed enhanced CRM system may have automatically identified an action that was committed to (i.e., promised) by the customer contact. This action may be identified and used to create "resolution notes" that a customer facing user may simply accept. Other post-call activities as described above may similarly be automated and prompted for prior to (or while) the enhanced CRM system identifies a next target contact for this customer facing user.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computing system implementing a customer relationship management (CRM) system, the computing system comprising:
one or more processors communicatively coupled to each other; and
a non-transitory computer-readable storage medium, accessible by the one or more processors, and storing executable instructions that, when executed by the one or more processors, cause the computing system to:
identify a plurality of customer target contacts from a plurality of customers, each customer target contact being associated with an outstanding task item;
identify a first user as a customer-facing user of the CRM system based on an authentication of the first user to the CRM system;
select a subset of the plurality of customer target contacts for contact by the first user within a work period;
initiate a real-time interactive contact between the first user and a first customer target contact of the subset of customer target contacts;
monitor the real-time interactive contact to create monitored information associated with the first customer target;
execute a machine learning model in real-time as the real-time interactive contact is occurring to correlate the monitored information with historical information, wherein the historical information comprises at least one of previous interactive contact information associated with previous interactive contacts of the first customer target or the first user, historical debt collection information associated with the first customer target, or derived information generated from one or more machine learning algorithms analyzing the previous interactive contacts of the first customer target or the first user or the historical debt collection information associated with the first customer target;
based on the real-time correlation between the monitored information and the historical information, determine, generate, and display one or more real-time recommended actions to the first user with respect to the real-time interactive contact;
provide an indication of termination of the real-time interactive contact; and
responsive to the indication of termination:
collect the monitored information;
obtain results information associated with the real-time interactive contact;
store at least a portion of the monitored information and the results information in a data store; and
execute the one or more machine learning algorithms to update the machine learning model based on the monitored information and the results information, the updated machine learning model for use in future interactive contacts;
wherein the computing system is configured to provide one or more follow-up recommended actions for the first user with respect to the real-time interactive contact, the one or more follow-up recommended actions comprising scheduling a follow-up contact to the first customer target contact or recording a date and an amount of a promise to pay, the one or more follow-up recommended actions are configured to be executed in response to the first user's approval; and
wherein the one or more follow-up recommended actions are configured to be stored in the data store and are used to update the machine learning model.

2. The computing system of claim 1, wherein the one or more follow-up recommended actions include recording a date and action to be performed by the first customer target contact to validate resolution of an outstanding help desk ticket.

3. The computing system of claim 1, wherein the one or more follow-up recommended actions include a recommended strict action to take with respect to an outstanding debt of the first customer target.

4. The computing system of claim 1, wherein the one or more follow-up recommended actions include suppression of a scheduled strict action to take with respect to an outstanding debt of the first customer target.

5. The computing system of claim 1, wherein the executable instructions, when executed by the one or more processors, further cause the computing system to:
provide an interactive prompt to the first user to authorize automatic implementation of one or more follow-up recommended actions with respect to the real-time interactive contact.

6. The computing system of claim 5, wherein the executable instructions, when executed by the one or more processors, further cause the computing system to:
responsive to an affirmative acknowledgement of the interactive prompt by the first user, automatically implement the one or more follow-up recommended actions with respect to the real-time interactive contact and the first customer target.

7. The computing system of claim 1, wherein the CRM system supports an information technology help desk.

8. The computing system of claim 1, wherein the CRM system supports an accounts receivable collections desk.

9. The computing system of claim 1, wherein the CRM system supports a sales desk.

10. A computer implemented method for performing management of customer contacts using a customer relationship management (CRM) system, the method comprising:
identifying, using a computing system, a plurality of customer target contacts from a plurality of customers, each customer target contact being associated with an outstanding task item;
identifying, using the computing system, a first user as a customer-facing user of the CRM system based on an authentication of the first user to the CRM system;
selecting, using the computing system, a subset of the plurality of customer target contacts for contact by the first user within a work period;
initiating, using the computing system, a real-time interactive contact between the first user and a first customer target contact of the subset of customer target contacts;
monitoring, using the computing system, the real-time interactive contact to create monitored information associated with the first customer target;
executing, using the computing system, a machine learning model in real-time as the real-time interactive contact is occurring to correlate the monitored information with historical information, wherein the historical information comprises at least one of previous interactive contact information associated with previous interactive contacts of the first customer target or the first user, historical debt collection information associated with the first customer target, or derived information generated from one or more machine learning algorithms analyzing the previous interactive contacts of the first customer target or the first user or the historical debt collection information associated with the first customer target;
based on the real-time correlation between the monitored information and the historical information, determining, generating, and displaying, using the computing system, one or more real-time recommended actions to the first user with respect to the real-time interactive contact;
providing, using the computing system, an indication of termination of the interactive contact; and
responsive to the indication of termination:
collecting, using the computing system, the monitored information;
obtaining, using the computing system, results information associated with the real-time interactive contact;
storing, using the computing system, at least a portion of the monitored information and the results information in a data store; and
executing, using the computing system, the one or more machine learning algorithms to update the machine learning model based on the monitored information and the results information, the updated machine learning model for use in future interactive contacts;
wherein the computing system is configured to provide one or more follow-up recommended actions for the first user with respect to the real-time interactive contact, the one or more follow-up recommended actions comprising scheduling a follow-up contact to the first customer target contact or recording a date and an amount of a promise to pay; and
wherein the computing system is further configured to provide an interactive prompt to the first user to authorize automatic implementation of one or more follow-up recommended actions with respect to the real-time interactive contact and responsive to an affirmative acknowledgement of the interactive prompt by the first user, automatically implement the one or more follow-up recommended actions with respect to the real-time interactive contact and the first customer target.

11. The computer implemented method of claim 10, wherein the CRM system supports an information technology help desk.

12. The computer implemented method of claim 10, wherein the CRM system supports an accounts receivable collections desk.

13. The computer implemented method of claim 10, wherein the CRM system supports a sales desk.

14. A non-transitory computer-readable storage medium including executable instructions that, when executed by a processor, cause the processor to:
identify a plurality of customer target contacts from a plurality of customers, each customer target contact being associated with an outstanding task item;
identify a first user as a customer-facing user of a customer relationship management (CRM) system based on an authentication of the first user to the CRM system;
select a subset of the plurality of customer target contacts for contact by the first user within a work period;
initiate a real-time interactive contact between the first user and a first customer target contact of the subset of customer target contacts;
monitor the real-time interactive contact to create monitored information associated with the first customer target;
execute a machine learning model in real-time as the real-time interactive contact is occurring to correlate the monitored information with historical information, wherein the historical information comprises at least one of previous interactive contact information associated with previous interactive contacts of the first customer target or the first user, historical debt collection information associated with the first customer target, or derived information generated from one or more machine learning algorithms analyzing the previous interactive contacts of the first customer target or the first user or the historical debt collection information associated with the first customer target;

based on the real-time correlation between the monitored information and the historical information, determine, generate, and display one or more real-time recommended actions to the first user with respect to the real-time interactive contact;

provide an indication of termination of the real-time interactive contact; and responsive to the indication of termination:
   collect the monitored information;
   obtain results information associated with the real-time interactive contact;
   store at least a portion of the monitored information and the results information in a data store; and
   execute the one or more machine learning algorithms to update the machine learning model based on the monitored information and the results information, the updated machine learning model for use in future interactive contacts;

wherein the computing system is configured to provide one or more follow-up recommended actions for the first user with respect to the real-time interactive contact, the one or more follow-up recommended actions comprising scheduling a follow-up contact to the first customer target contact or recording a date and an amount of a promise to pay, the one or more follow-up recommended actions are configured to be executed in response to the first user's approval; and wherein the one or more follow-up recommended actions are configured to be stored in the data storage and are used to update the machine learning model.

15. The non-transitory computer readable medium of claim 14, wherein the CRM system supports an information technology help desk.

16. The non-transitory computer readable medium of claim 14, wherein the CRM system supports an accounts receivable collections desk.

17. The computing system of claim 1, wherein the previous interactive contacts of the first customer target or the first user comprise at least one of one or more audio recordings or textual transcriptions of one or more previous calls associated with the first customer target or the first user.

\* \* \* \* \*